(12) United States Patent
Chen et al.

(10) Patent No.: US 7,657,138 B1
(45) Date of Patent: Feb. 2, 2010

(54) METHOD AND APPARATUS FOR PROVIDING FREE-SPACE OPTICAL CROSS-CONNECTIONS

(75) Inventors: David Z. Chen, Richardson, TX (US); Joseph Finn, Upper Saddle River, NJ (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 0 days.

(21) Appl. No.: 12/211,931

(22) Filed: Sep. 17, 2008

(51) Int. Cl.
*G02B 6/26* (2006.01)
*H04J 14/00* (2006.01)

(52) U.S. Cl. .............................. 385/31; 385/25; 385/27; 385/15; 398/55; 398/56

(58) Field of Classification Search .................. 385/15, 385/17, 18, 25, 26, 27, 31, 39, 47; 398/55, 398/56, 59, 96, 103, 130
See application file for complete search history.

(56) References Cited

U.S. PATENT DOCUMENTS

| | | | | |
|---|---|---|---|---|
| 4,634,239 A * | 1/1987 | Buhrer | ......................... | 385/18 |
| 4,943,137 A * | 7/1990 | Speer | ........................... | 385/26 |
| 5,115,481 A * | 5/1992 | Buhrer | ......................... | 385/25 |
| 5,960,132 A * | 9/1999 | Lin | .............................. | 385/18 |
| 6,535,664 B1 * | 3/2003 | Anderson | ..................... | 385/18 |
| 2003/0063838 A1 * | 4/2003 | Hagood et al. | ................ | 385/16 |
| 2004/0022480 A1 * | 2/2004 | Riester | ........................ | 385/18 |

* cited by examiner

*Primary Examiner*—Brian M Healy

(57) ABSTRACT

An approach is provided for a free-space optical switch. A command is received to change a connection state of a free-space optical transmission path. A mirror is controlled to change the connection state of the free-space optical transmission path with respect to a particular port of a plurality of ports that interface to respective optical fibers, wherein the ports correspond to holes disposed about a circumferential surface of a port ring.

23 Claims, 7 Drawing Sheets

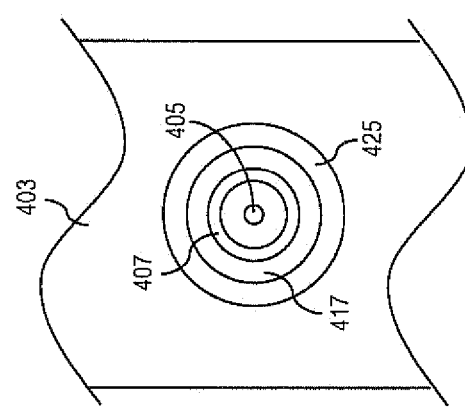
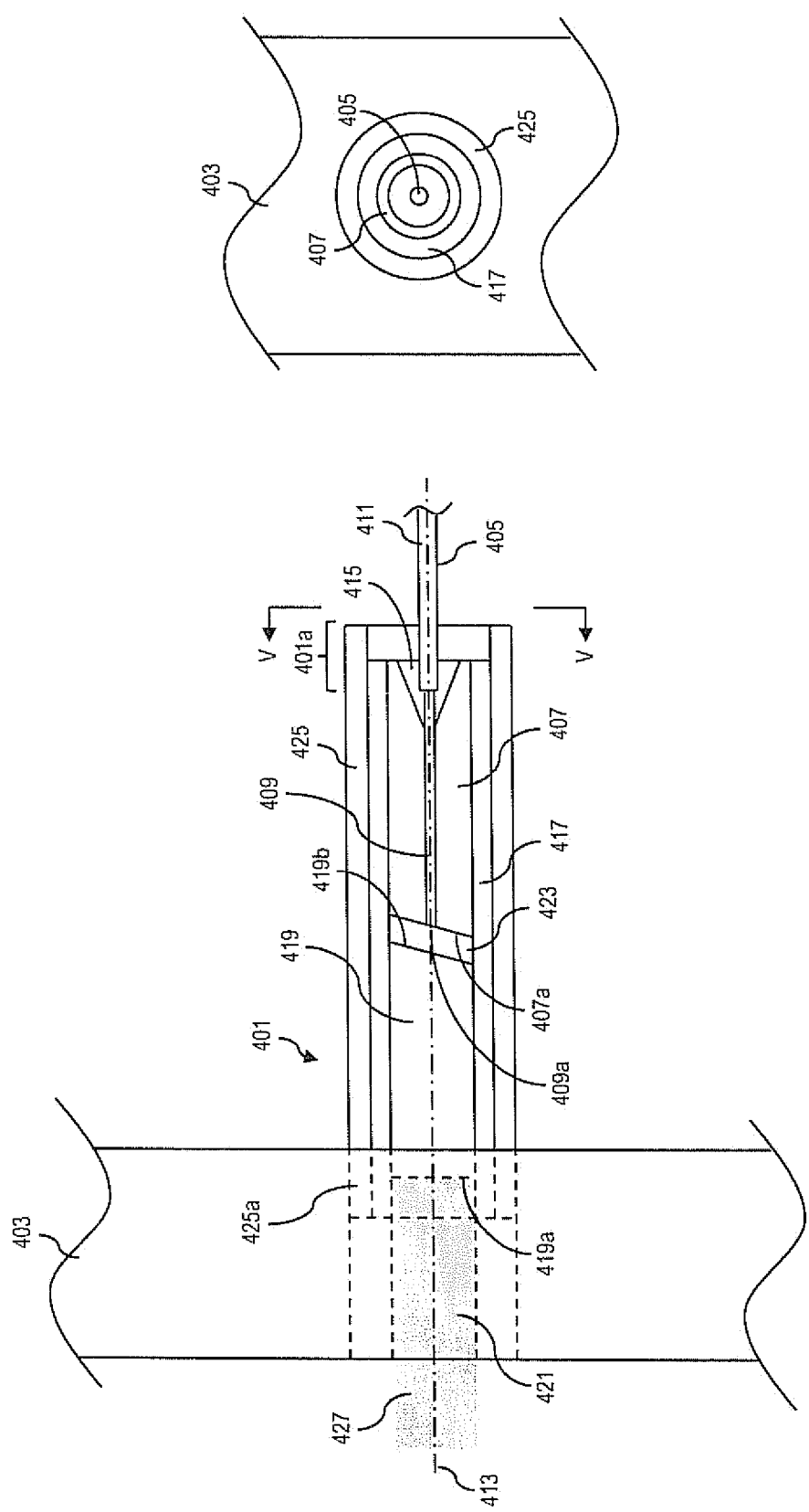

METHOD AND APPARATUS FOR PROVIDING FREE-SPACE OPTICAL CROSS-CONNECTIONS

BACKGROUND INFORMATION

With an increase in demand for broadband communications and services, telecommunication service providers are migrating towards long-distance, large-capacity optical communication networks. These fiber optic transmission systems typically utilize switches to provide termination and cross-connection between various fiber optic links, such as between main trunk lines and subscriber lines. In this manner, conventional switches generally have two corresponding pluralities of fiber optic lines, i.e., an incoming set (e.g., main trunk lines) and an outgoing set (e.g., subscriber lines). It is common for the incoming and outgoing fibers to be terminated at fixed positions. Utilizing a switch matrix, telecommunication service providers can achieve full photonic switching, i.e., optical-to-optical signal transmission between incoming and outgoing fibers.

Within the realm of free-space optical switching, a switch matrix will typically include a plurality of trajectory adjusters (e.g., mirrors) for establishing free-space optical transmission paths between incoming and outgoing fibers. Conventionally, "N×M" free-space optical cross-connects utilizing mirrors have been created that operate via an array of "N×M" mirrors that redirect an input optical signal from one of "N" input fibers to one of "M" designated output fibers. Compared to conventional copper wiring cross-connects, free-space optical cross-connects require a higher level of precision in terms of care to ensure and maintain proper connections. Traditionally, provisioning and tracking these free-space optical cross-connects has been complex and expensive, which is substantially attributable to the costs and intricacies of creating, controlling, and monitoring suitable mirror arrays.

Therefore, there is a need for cost-effective, free-space optical cross-connects for establishing, switching between, and tracking free-space optical transmission paths.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIGS. 4 and 5 are schematic diagrams of an optical alignment mechanism, according to an exemplary embodiment;

DESCRIPTION OF THE PREFERRED EMBODIMENT

A preferred apparatus, method, and software for providing free-space optical cross-connects are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although the various exemplary embodiments are described with respect to free-space optical cross-connects that switch optical signals within telecommunications infrastructures, it is contemplated that various exemplary embodiments are also applicable free-space optical switching within other working environments.

Figure 1:
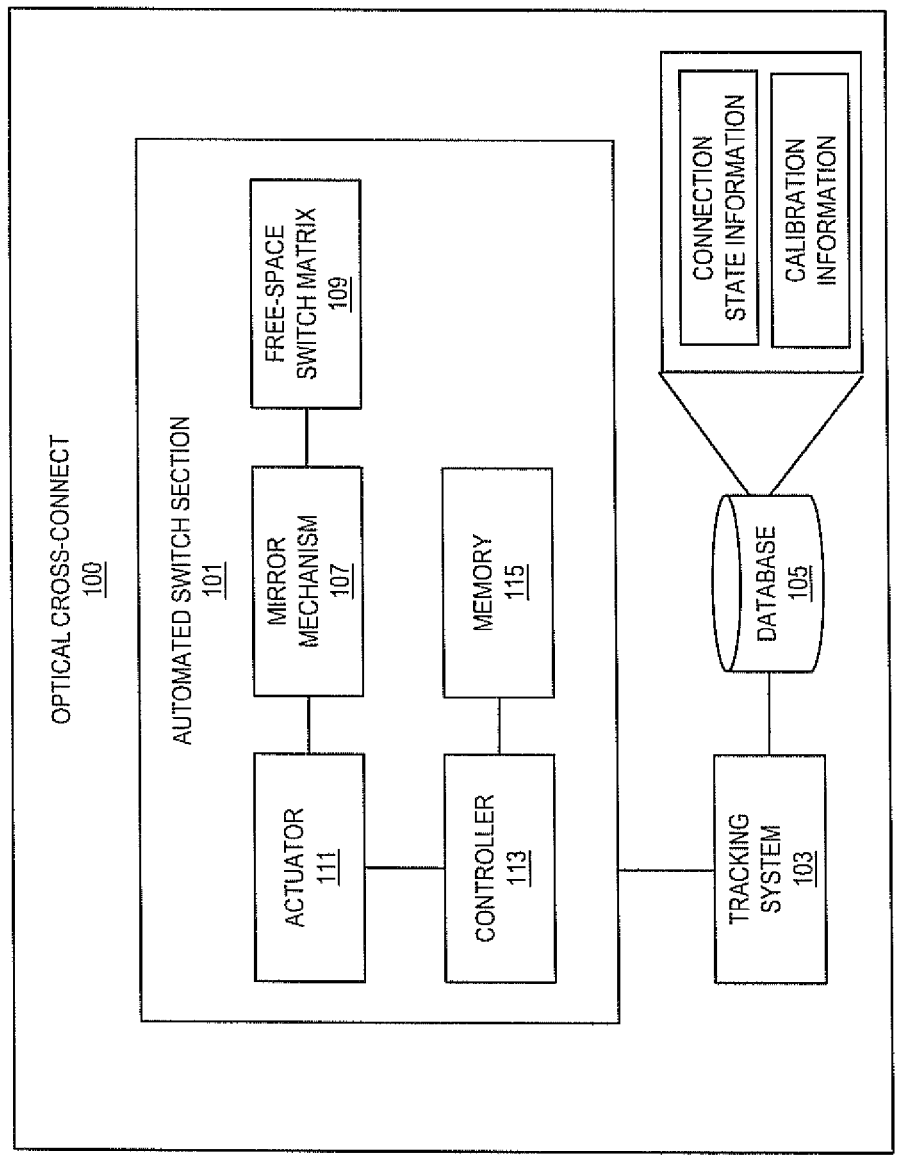
FIG. 1 is a block diagram of an optical cross-connect, according to an exemplary embodiment.

FIG. 1 is a block diagram of an optical cross-connect, according to an exemplary embodiment. In this example, optical cross-connect 100 is a free-space optical cross-connect that includes automated switch section 101 and tracking system 103 coupled to database (or repository) 105. Automated switch section 101 utilizes one or more mirror mechanisms 107 to switch optical signals between input and output ports (not shown) of free-space optical switch matrix 109. Optical cross-connect 100 may be utilized within a telecommunications infrastructure, such as for transmission of optical signals between incoming and outing transmission lines of a transport network or other type of communication system. Thus, free-space optical signal transmission paths can be arranged and rearranged via mirror mechanism(s) 107 by creating or breaking the one or more free-space optical transmission paths. While specific reference will be made thereto, it is contemplated that optical cross-connect 100 may embody many forms and include multiple and/or alternative components.

It is recognized that the deployment of efficient, cost-effective optical cross-connects enable large scale transport networks, such as fiber optical transport networks, to be more flexible, more susceptible to fluid changes, and more accessible for configuration, maintenance, and testing procedures, as well as more prepared for future infrastructure growth and expansion. As such, it is often necessary for telecommunication service providers to switch optical signals between different optical transmission paths of the optical cross-connects. These transmission paths may be established along optical waveguides (e.g., optical fibers), in free-space, or a combination thereof. Accordingly, switching ideologies of conventional optical cross-connects tend to be categorized into two general classifications, i.e., moving-beam cross-connects and moving-fiber cross-connects. Moving-beam (or free-space) cross-connects direct and redirect optical signal paths between input and output ports coupled to, for example, stationary waveguides. Moving-fiber cross-connects (e.g., optical fiber patch cord cross-connects) physically manipulate optical signal paths by changing the orientation (or location) of input, output, or patch cord optical fibers. While moving-fiber cross-connects can be viable, they are generally more expensive and more bulky than moving-beam cross-connects. Further, moving-beam optical cross-connects are more technologically attractive because insertion losses can be minimized, as well as made constant across the optical ports of the optical cross-connect.

As previously mentioned, conventional provisioning and tracking of free-space optical cross-connects has been complex and expensive, mainly due to the costs and intricacies of creating, controlling, and monitoring suitable mirror arrays. For example, traditional free-space optical cross-connects incorporating mirror arrays for "N" input fibers and "M"

output fibers, typically require at least one mirror array including at least "N" times "M" number of mirrors. In turn, each of the "N" times "M" mirrors of the at least one "N×M" mirror array must be capable of independent control, not to mention, the various free-space optical transmission paths to and from the "N" input fibers and the "M" output fibers must be independently aligned to the respective mirrors of the "N×M" mirror array. Furthermore, as the number of input and output optical fibers increase, so too does the variance between the shortest and the longest free-space optical transmission path lengths of traditional free-space optical cross-connects. Invariably, this creates a distribution of optical insertion losses due to the array of length differences in the free-space optical transmission paths. These length differences also affect sizing and spacing considerations for the various individual mirrors of the at least one "N×M" mirror array, as well as the sizing of transmitted free-space optical signals. Namely, as the propagation length of the free-space optical signal increases, a "waist" of the free-space optical beam will increasingly diverge (or spread). Larger optical beam waists require larger and larger mirrors to minimize the effects of clipping losses. It is noted, however, that the sizing of traditional free-space optical cross-connects is limited by a maximum optical beam waist parameter. In particular, since insertion losses increase with increases in mirror tilt (which is performed to create the free-space optical transmission paths), and coupling efficiency decreases with increases in this mirror tilt, the sizing of a free-space optical cross-connect cannot become too large, as mirror tilts beyond an acceptable range will be required. Moreover, monitoring the various mirrors and/or free-space optical transmission paths becomes more and more burdensome as the port count of the free-space optical cross-connect increases.

Therefore, the approach employed by optical cross-connect 100, according to certain embodiments, stems from the recognition that by creating a three-dimensional free-space optical switch matrix, whereby "N" input optical fibers can be switched between utilizing at least one automated mirror mechanism, and "M" output optical fibers are switched between utilizing at least one other automated mirror mechanism, telecommunication service providers can substantially reduce the cost and complexity of free-space, moving-beam optical cross-connects. Moreover, aligning the free-space optical transmission paths to the automated mirror mechanisms can be simplified, not to mention that the complexity in monitoring (or tracking) the free-space optical cross-connect can be reduced. Furthermore, by centralizing the positioning of the mirror mechanisms within the three-dimensional space of the free-space optical switch matrix, telecommunication service providers can minimize a maximum insertion loss, as well as obtain uniformity of insertion loss at the several input and output ports despite increases in size and port count of free-space optical cross-connection 100.

As seen in FIG. 1, mirror mechanisms 107 are operated via one or more actuators (e.g., motors) 111 that are controlled by one or more controllers (or processors) 113. Actuators 111 manipulate the mechanical components of mirror mechanisms 107. According to one embodiment, actuators 111 can include suitable belt drives, comb drives, electroactive polymers, hydraulic mechanisms, motors, pistons, piezoelectric mechanisms, pneumatic mechanisms, relays, step motors, thermal bimorphs, etc. For instance, actuators 111 cause the displacement, extension, retraction, and/or rotation of mirror mechanisms 107 based on information provided by controller 113. That is, controller 113 controls the operation of actuators 111 and, thereby, mirror mechanisms 107 according to programs and/or data stored to memory 115. Memory 115 may represent a hierarchy of memory, which may include both random access memory (RAM) and read-only memory (ROM). Computer instructions, such as control logic, path planning, and move sequence instructions, as well as corresponding data for manipulating mirror mechanisms 107, can be stored in non-volatile memory, such as erasable programmable read-only memory (EPROM), electrically erasable programmable read-only memory (EEPROM), and/or flash memory. Memory 115 may be implemented as one or more discrete devices, stacked devices, or integrated with controller 113 or database 105.

In this manner, control functions may be implemented in a single controller or via multiple controllers. Suitable controllers 113 may include, for example, both general purpose and special purpose controllers or digital signal processors. According to exemplary embodiments, controller 113 is configured to receive control and configuration information over one or more communication networks (not shown) for controlling automated switch section 101 (i.e., mirror mechanisms 107) and, thereby, may include or interface with a communication interface (not illustrated). Suitable communication networks may include local area networks (LAN), metropolitan area networks (MAN), wide area networks (WAN), the Internet, etc. Automated switch section 101 and, in particular, the configuration of free-space optical switch matrix 109 and mirror mechanisms 107, is more fully described in connection with FIGS. 2-4.

It is also noted that optical cross-connect 100 includes tracking system 103 coupled to database 105 for monitoring free-space optical switching and/or one or more optical transmission paths created via optical cross-connect 100. While illustrated as part of optical cross-connect 100, it is contemplated that tracking system 103 and/or database 105 may interface with optical cross-connect 100 over one or more of the aforementioned communication networks, such as may be the case when a centralized network management system is utilized to monitor the free-space optical switching and/or one or more optical transmission paths created via optical cross-connect 100. It is noted that the physical positioning of mirror mechanisms 107 with respect to free-space optical switch matrix 109 establishes connection states (e.g., free-space optical transmission paths) between incoming and outgoing ports respectively coupled to incoming and outgoing optical fiber transmission lines. Accordingly, a change in one position with respect to one port is considered a change of connection state; in one embodiment, such position information is stored within database 105. In this manner, tracking system 103 can monitor free-space optical transmission paths formed via mirror mechanisms 107 and can record corresponding connection mapping information to database 105. This connection mapping information may include positioning information for mirror mechanisms 107 within free-space optical switch matrix 109. As will become more apparent below, tracking system 103 can be utilized to monitor the axial position and radial rotation of mirror mechanisms 107 within free-space optical switch matrix 109, i.e., utilized to track the physical configuration of mirror mechanisms 107 with respect to the several input and output ports. In doing so, tracking system 103 can develop or even learn optimum positioning information for establishing free-space optical transmission paths between the various input and output ports of free-space optical switch matrix 109. This optimization information can be utilized to obtain a lowest insertion loss, a highest coupling efficiency, etc., and can be recorded to database 105. Similarly, tracking system 103 can utilize the optimization information to calibrate the positioning of mirror mechanisms 107 with respect to the input and output ports of free-space optical switch matrix 109. Thus, in a periodic, on-demand, or other temporal fashion, tracking system 100 can assess and reassess the optimization and/or calibration of the positioning information stored to database 105 and, thereby, the performance of optical cross-connect 100.

Monitoring procedures may, in exemplary embodiments, be achieved through out-of-band communications. That is, tracking system 103 can transmit out-of-band communications on respective free-space optical transmission paths, such that if a signal can be successfully transmitted between incoming and outgoing fiber optic transmission lines, i.e., between respective incoming and outgoing ports of switch matrix 109, it will indicate the existence of an established connection. Furthermore, and as will become more apparent below, by monitoring the relative positioning of mirror mechanisms 107, tracking system 103 can additionally (or alternatively) determine respective incoming and outgoing ports of free-space optical transmission paths through free-space optical switch matrix 109. Based on the success or failure of these out-of-band transmissions and/or the relative positioning of mirror mechanisms 107, tracking system 103 can generate connection mapping information, i.e., free-space optical transmission paths and corresponding incoming and outgoing port information. The connection mapping information can be stored to database 105 or any other suitable memory, such as memory 115. In other instances, tracking system 103 may alternatively (or additionally) monitor and record connection events, i.e., events corresponding to mirror mechanisms 107 establishing or "breaking" free-space optical transmission paths through free-space optical switch matrix 109. Other suitable information may also be monitored by tracking system 103 and, thereby, stored to database 105. For instance, tracking system 103 may monitor and compile information corresponding to routing information (e.g., traffic source and destination points, network traffic path, etc.), network traffic information (e.g., reserved bandwidth, consumed bandwidth, class of service, etc.), optical fiber transmission line configuration or performance information (e.g., attenuation, frequency, insertion loss, numerical aperture, single/multimode, spectral range, etc.), as well as other like or equivalent information.

The operation of automated switch section 101 is now described; in particular, with respect to the configuration of and between mirror mechanisms 107 and free-space optical switch matrix 109.

Figure 2:
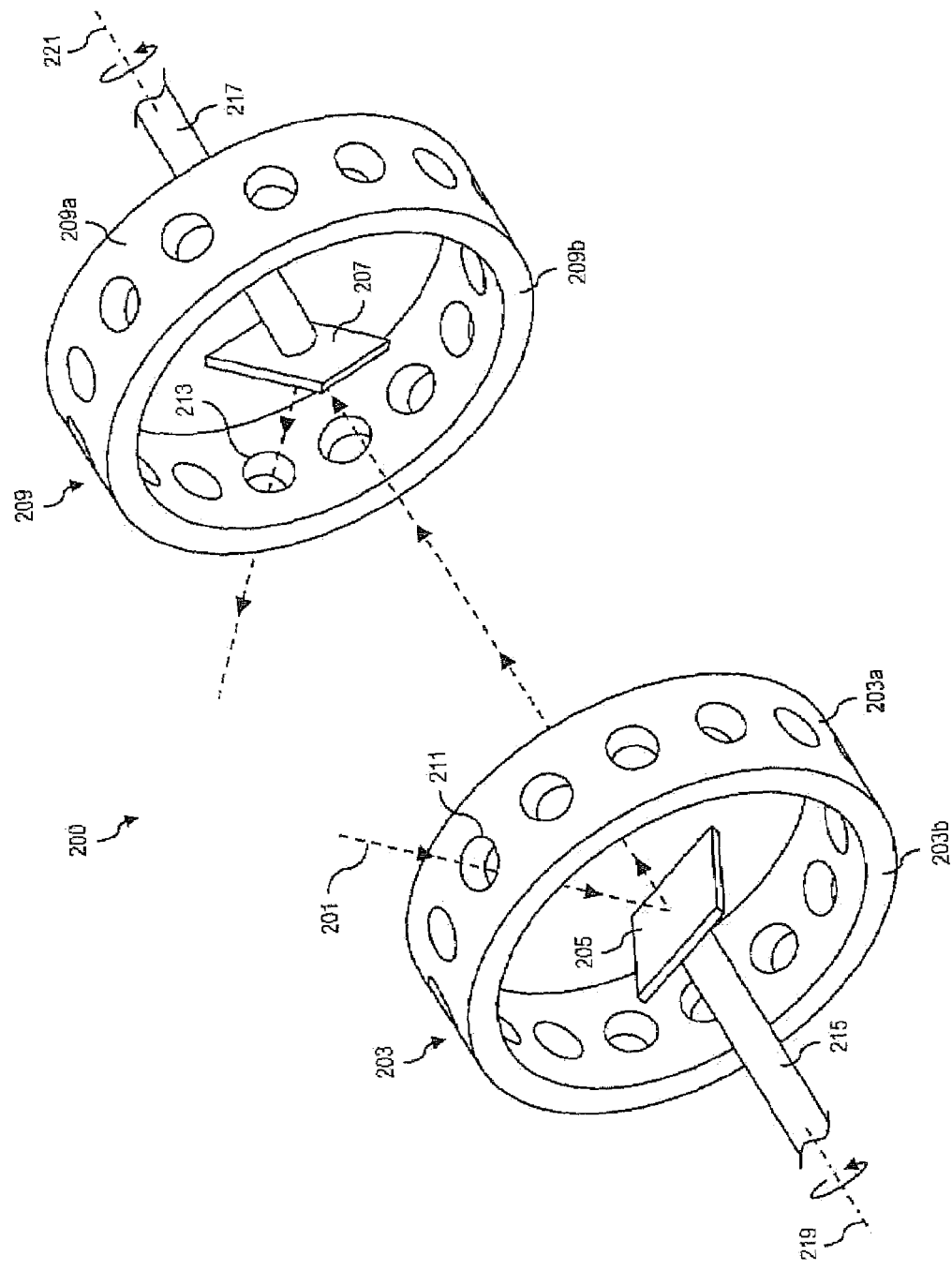
FIGS. 2 and 3 are schematic diagrams of free-space optical switch matrices incorporating automated mirror mechanisms, according to exemplary embodiments.
Figure 3:
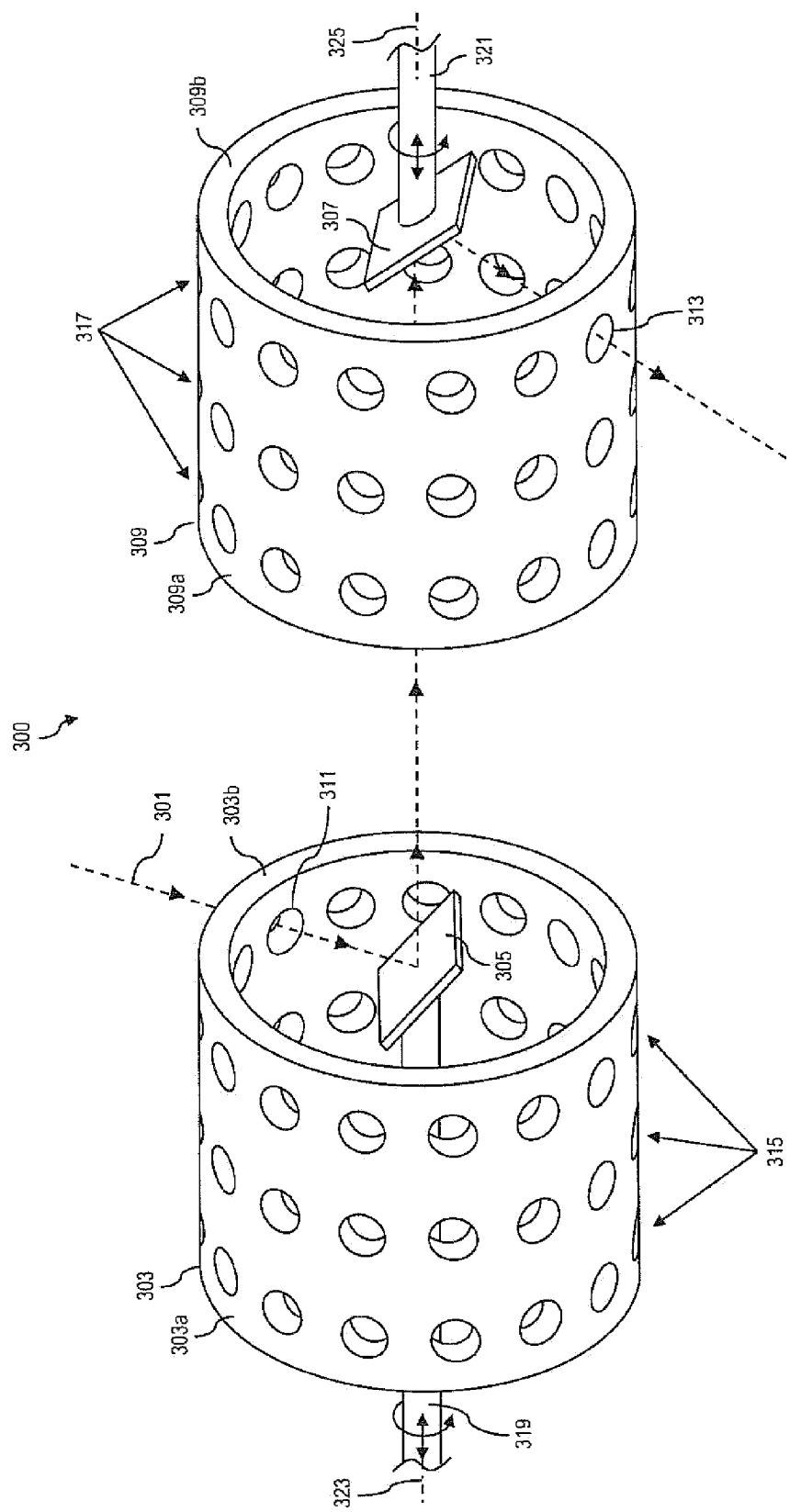

FIGS. 2 and 3 are schematic diagrams of free-space optical switch matrices incorporating automated mirror mechanisms, according to exemplary embodiments. In these examples, free-space optical switch matrices 200 and 300 are exemplary switch matrices for establishing automated cross-connections—i.e., respective free-space optical transmission paths 201 and 301—between incoming and outgoing optical fiber transmission lines (not illustrated). Switch matrices 200 and 300 respectively include input port rings 203 and 303; mirror mechanisms 205, 207, 305 and 307; and output port rings 209 and 309. It is contemplated that free-space optical switch matrices 200 and 300 may embody many other forms and include multiple and/or alternative components.

Input port rings 203 and 303, as well as output port rings 209 and 309 are sleeve-like cylinders; however, other geometries, such as any suitable polygonal sleeve-like prism may be utilized. In this manner, port rings 203, 209, 303, and 309 have central bores for receiving mirror mechanisms 205, 207, 305, 307, therein. Furthermore, input port rings 203 and 303, as well as output port rings 209 and 309 include respective pluralities of bores arranged about circumferential surfaces of port rings 203, 209, 303, and 309. These bores (i.e., "holes") effectively correspond to "switch ports," as will become more apparent below.

According to one embodiment, input port rings 203 and 303 include respective pluralities of incoming ports (e.g., incoming ports 211 and 311) arranged in a radial fashion about circumferential surfaces 203a and 303a of input port rings 203 and 303, respectively. In a similar manner, output port rings 209 and 309 include respective pluralities of outgoing ports (e.g., outgoing ports 213 and 313) arranged in a radial fashion about circumferential surfaces 209a and 309a of output port rings 209 and 309, respectively. As such, input port ring 203 and output port ring 209 include single rings of respective incoming and outgoing ports, while input port ring 303 and output port ring 309 include multiple rings 315 and 317 of respective incoming and outgoing ports. It is noted that the respective incoming and outgoing ports of the respective rings of incoming and outgoing ports are equidistant from respective terminal faces 203b, 209b, 303b, and 309b of incoming and outgoing port rings 203, 209, 303, and 309. In other words, the various ports of a ring of ports are arranged along a same circumference of a respective circumferential surface (e.g., circumferential surface 203a, 209a, 303a, or 309a). However, it is also contemplated that the incoming and/or outgoing ports of incoming port rings 203 and 303 and outgoing port rings 209 and 309 can be arranged in any suitable array or matrix of incoming or outgoing ports. Further, while shown having particular numbers of incoming or outgoing ports and/or rings of incoming or outgoing ports, it is contemplated that any suitable number of incoming or outgoing ports, as well as any suitable number of rings of incoming or outgoing ports may be provisioned to incoming and/or outgoing port rings 203, 209, 303, and 309. In this manner, the spacing between incoming or outgoing ports, and/or rings of incoming or outgoing ports may be constant, equidistant, staggered, variable, or configured in any other suitable arrangement.

In exemplary embodiments, the incoming ports (e.g., incoming port 211 or 311) of incoming port rings 203 and 303 can be configured to directly couple to respective optical fiber transmission lines (not shown), such as through a spliced or connectorized arrangement, or may be configured to indirectly couple to respective optical fiber transmission lines through respective optical alignment mechanisms (not illustrated). The same can be true of outgoing ports (e.g., outgoing ports 213 and 313) of outgoing port rings 209 and 309. An exemplary optical alignment mechanism is explained in more detail in conjunction with FIGS. 4 and 5.

In exemplary embodiments, mirrors 205, 207, 305, and 307 are respectively supported by, e.g., cantilevered from, support shafts 215, 217, 319, and 321. Support shafts 215 and 217 and support shafts 319 and 321 can be concentrically aligned with one another, as well as concentrically aligned with input and output port rings 203, 209, 303, and 309. That is, input port rings 203 and 303, as well as support shafts 215 and 319 can be respectively aligned to axial centerlines 219 and 323. Further, output port rings 209 and 309, as well as support shafts 217 and 321 can be respectively aligned to axial centerlines 221 and 325. In this manner, axial centerlines 219 and 221 can coincide, while axial centerlines 323 and 325 can coincide. Further, support shafts 215, 217, 319, and 321 are, in exemplary embodiments, capable of automated movement, i.e., are capable of rotating about respective axes of rotation 219, 221, 323, and 325. Support shafts 319 and 321 are also, in exemplary embodiments, capable of automated axial translation along respective axial centerlines 219, 221, 323, and 325. When concentrically aligned, rotational axes (or axial centerlines) 219 and 221 are coincident with one another. The same is true for rotational axes (or axial centerlines) 323 and 325.

Mirrors 205, 207, 305, and 307 can be fixed at respective distal ends of support shafts 215, 217, 319, and 321 at predetermined angles, such as 45° angles. In this manner, a free-space optical transmission path (e.g., free-space optical transmission path 301) projected from an incoming port (e.g., incoming port 211) at an angle normal to an interior surface of an input port ring (e.g., input port ring 203), will thereby have an angle of incidence at a mirror (e.g., mirror 205) that, when the free-space optical transmission path is redirected via the mirror, causes the angle between the incident optical beam and the redirected optical beam to be 90°. It is contemplated, however, that mirrors 205, 207, 305, and 307 can be capable of automated rotation about respective support shafts 215, 217, 319, and 321, i.e., about rotational axes 219, 221, 323, and 325. As such, mirrors 205, 207, 305, and 307 can be "centralized" in the interior, three-dimensional space of input and output port rings 203, 209, 303, and 309 but, more specifically, made equidistant to the respective incoming and outgoing ports of input and output port rings 203, 209 303, and 309. This enables insertion losses and free-space optical coupling efficiencies to be uniformly established with respect to the various incoming and outgoing ports, as well as minimized.

According to exemplary embodiments, mirrors 205, 207, 305, and 307 are generally rectangular in shape and have corresponding reflective optical surfaces for directing or redirecting the trajectories of free-space optical transmission paths (e.g., free-space optical transmission paths 201 and 301) between incoming and outgoing ports (e.g., incoming ports 211 and 311 and outgoing ports 213 and 313) of incoming and outgoing port rings 203, 209, 303, and 309. It is noted, however, that any suitable geometry may be utilized, such as circular shapes or other polygonal shapes. According to particular embodiments, the optical surfaces of mirrors 205, 207, 305, and 307 are thin-film reflective surfaces, such as single-crystal silicon mirrors. It is noted, however, that the reflective optical surfaces of mirrors 205, 207, 305, and 307 may be tailored to the particular wavelength(s) of the optical signals being transported through free-space optical switch matrices 200 and 300. As such, other materials and/or configurations for mirrors 205, 207, 305, and 307 are contemplated. Further, the optical surfaces of mirrors 205, 207, 305, and 307 are, in exemplary embodiments, relatively smooth. This enables mirrors 205, 207, 305, and 307 to prevent or, at least, minimize performance diminishing effects, such as optical scattering, which are caused by surface roughness, e.g., surface undulations, inconsistencies, etc. Moreover, the optical surface may be relatively flat, i.e., without any substantial curvatures that could otherwise decrease the free-space transmission path coupling efficiency of mirrors 205, 207, 305, and 307 with respect to corresponding incoming and outgoing ports of incoming and outgoing port rings 203, 209, 303, and 309.

In order to increase the coupling efficiency of free-space optical switch matrices 200 and 300, free-space optical transmission paths 201 and 301 may also be aligned, collimated, or otherwise acted upon by respective components of free-space optical switch matrices 200 and 300. That is, the various input ports (e.g., input port 211 and 311) of input port rings 203 and 303, as well as the various output ports (e.g., output ports 213 and 313) of output port rings 209 and 309 can include one or more optical alignment mechanisms (not shown) that are, in turn, coupled to corresponding incoming or outgoing optical fibers (not illustrated). An exemplary optical alignment mechanism interfacing with an exemplary port ring is described in more detail in association with FIGS. 4 and 5.

Furthermore, by way of example, after manufacturing and assembling free-space optical switch matrices 200 and 300, tracking system 103 may be utilized to learn the optimum positioning (e.g., axial position from, for example, terminal faces 203b, 209b, 303b, and 309b and radial rotation about centerlines 219, 221, 323, and 325) for mirrors 205, 207, 305, and 307 within the three-dimensional interior space of input and output rings 203, 209, 303, and 309. This positioning information may be utilized to establish optically efficient, low insertion loss free-space optical transmission paths among the various incoming and outgoing ports of input and output port rings 203, 209, 303, and 309. Moreover, this positioning information may be stored to database 105 and, thereby, made available to controller 113 for quickly and efficiently establishing "later" free-space optical transmission paths between the incoming and outgoing ports of input and output port rings 203, 209, 303, and 309. This optimization may also be utilized to calibrate free-space optical switch matrices 200 and 300 before and after placing optical cross-connect 100 in service. As such, it is contemplated that optimization or calibration may be performed intermittently (e.g., periodically, on-demand, etc.) by controller 113 while optical cross-connect 100 is in service. Thus, the optical performance and efficiency of optical cross-connection 100 can be maximized and tailored to its operating environment.

While free-space optical switch matrices 200 and 300 are shown having symmetrical configurations, i.e., having "N" input ports and "N" output ports, it is contemplated that free-space optical switch matrices 200 and 300 may be asymmetrically configured, i.e., having "N" input ports and "M" output ports. It is also contemplated that one or more free-space optical switch matrices may be linked via free-space transmissions or via spliced optical waveguides. In such instances, large-scale symmetric or asymmetric switching architectures may be configured via optical switch matrices 200 and/or 300. An exemplary switching architecture is described in more detail in connection with FIG. 6.

FIGS. 4 and 5 are schematic diagrams of an optical alignment mechanism, according to an exemplary embodiment. More particularly, FIG. 4 illustrates a side view, partly in cross-section, of an optical alignment mechanism 401 detachably coupled to a port ring 403, while FIG. 5 shows a cross-sectional axial view of optical alignment mechanism 401 taken at section V-V, according to an exemplary embodiment. Optical alignment mechanism 401 may be an optical collimator, focusing lens, or any other type of suitable optical coupler. In this example, optical alignment mechanism 401 is described as a conventional optical collimator.

According to one embodiment, an optical fiber 405 can be received within a central axial aperture of glass ferule 407 of optical alignment mechanism 401. Optical fiber 405 will typically include optical fiber core 409 encapsulated within, for example, a polymeric cover 411, such as of an acrylate or other suitable sheathing material. In this manner, optical fiber core 409 can extend axially through cover 411 along a central axis 413 and can be secured (or otherwise suspended) within cover 411 through, for example, a thermosetting polymer, such as an epoxy resin, or other suitable bonding agent. It is noted that optical fiber core 409 is, in exemplary embodiments, a telecommunications transmission quality fiber; however, optical fiber core 409 may be tailored to its operating environment and, thereby, may be any suitable waveguide medium for carrying light signals, such as a glass mediums (e.g., silica, fluorozirconate, fluoroaluminate, chalcogenide, etc.), plastic mediums (e.g., acrylic, perfluorinated polymers, etc.), etc., or a combination thereof.

In certain instances, cover 411 can be stripped from optical fiber core 409 in the portion received by glass ferrule 407. To provide strength and thermal stability, cover 411 may extend into a conical aperture 415 formed in a distal end of glass ferrule 407. A distal end of cover 411 may, or may not, abut against a corresponding distal end 407a of glass ferrule 407. As such, glass ferrule 407 typically holds only optical fiber core 409 and, in certain instances, any cladding material (not shown) of optical fiber 405. Additional adhesive and/or other stiffening members may be added to strengthen the joint between glass ferrule 407 and optical fiber core 409. Distal end face 407a of glass ferrule 407 coincides with distal end face 409a of optical fiber core 409. More specifically, distal end faces 407a and 409a can be cleaved, ground, and polished at a predetermined facet angle to prevent back reflection along an optical axis of optical fiber core 409, which can be concentrically aligned with central axis 413.

In addition, other configurations are contemplated. For instance, while optical fiber 405 has been described as "spliced" to optical alignment mechanism 401, it is contemplated that optical fiber 405 may be detachably coupled to optical alignment mechanism 401. In this manner, distal end 401a of optical alignment mechanism 401 may be connectorized for receiving and/or mating to a conventional fiber optic connector, such as of the screw, snap, or bayonet types. Exemplary conventional fiber optic connectors may include so called D4 connectors, E-2000 connectors, enterprise systems connection (ESCON) connectors, F-3000 connectors, ferrule connection (FC) connectors, local connector (LC) connectors, mechanical transfer registered jack (MT-RJ) connectors, multi-fiber push on (MPO) connectors, standard connector (SC) connectors, straight tip (ST) connectors, sub miniature A (SMA) connectors, sub miniature C (SMC) connectors, etc.

At any rate, glass ferrule 407 can be concentrically supported within a central bore of glass tube 417 that, in turn, can be concentrically aligned to central axis 413. Graded-index (GRIN) lens 419 can also be concentrically supported within the central bore of glass tube 417. As is well known, GRIN lenses are typically shaped like rods having indices of refraction varying along their radii. In this manner, GRIN lens 419 can optically perform like a convex lens. In certain embodiments, GRIN lens 419 has a plano distal end face 419a interfacing with port 421 of port ring 403, and a faceted distal end face 409b having a similar slope and orientation as the conjunction of distal end faces 407a and 409a of glass ferrule 407 and optical fiber core 409, respectively. A predetermined separation (or gap) 423 between distal end face 407a of glass ferrule 407 and distal end face 419b of GRIN lens 419 is established for creating a proper alignment, focus, collimation (or de-collimation), etc., effect upon an optical signal propagating optical alignment mechanism 401.

In exemplary embodiments, glass tube 417 can be supported by an exterior sleeve 425, such as a gold-plated stainless-steel tube, of optical alignment mechanism 401. Sleeve 425 includes a coupling region 425a for interfacing with, such as detachably coupling to, port 421 of port ring 403. As such, optical alignment mechanism 401 can project an aligned, collimated, focused, etc., optical beam 427 to a mirror (e.g., mirror 205 or 305) from an incoming optical signal of optical fiber 405. Alternatively, optical alignment mechanism may receive an aligned, collimated focused, etc., optical beam 427 from a mirror (e.g., mirror 207 or 307) for propagation as an outgoing optical signal on optical fiber 405.

Figure 6:
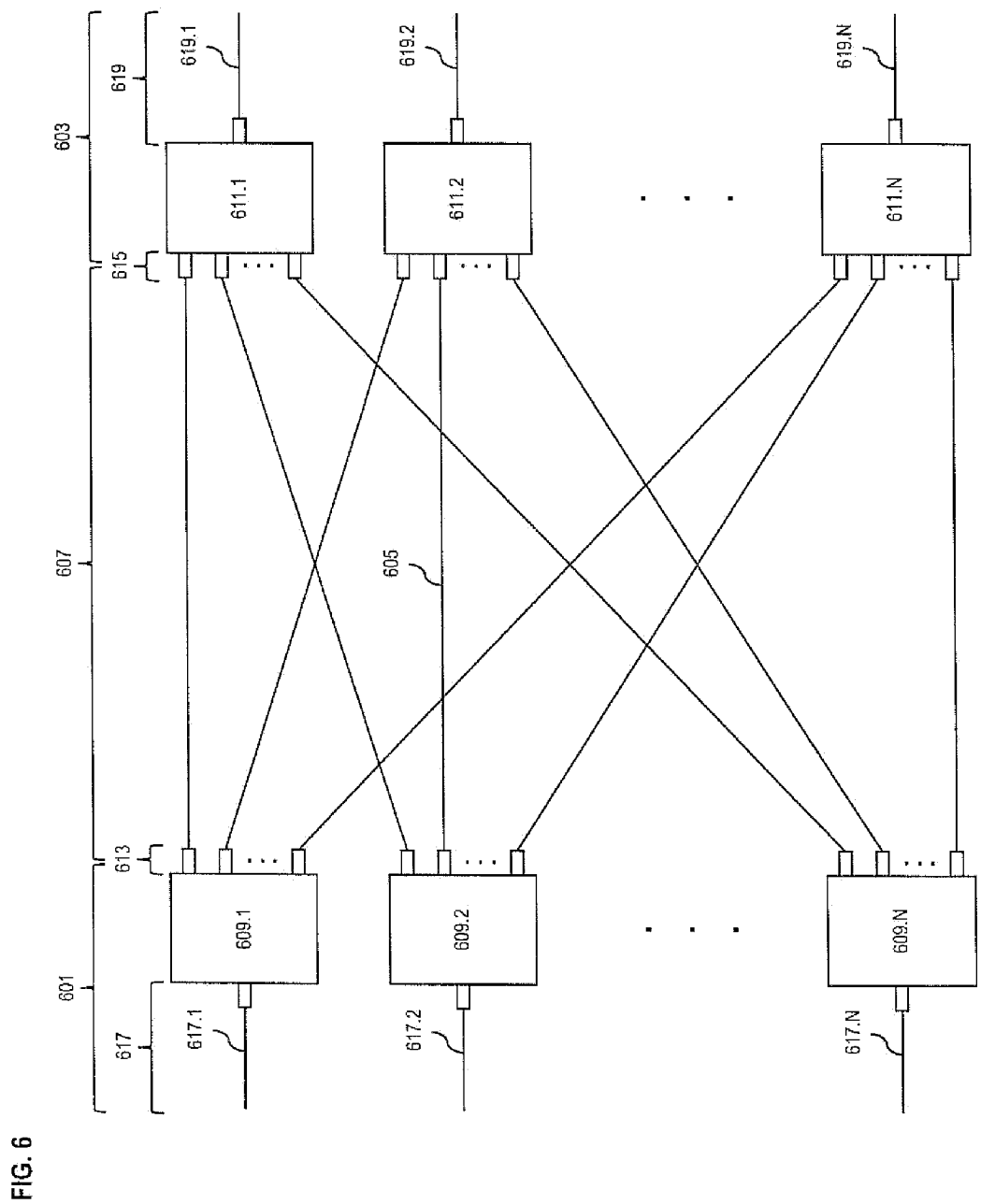
FIG. 6 is a conceptual block diagram of a switching architecture, according to an exemplary embodiment.

By combining one or more of the aforementioned free-space optical switch matrices, telecommunication service providers can provision both symmetric and asymmetric switching architectures. FIG. 6 is a conceptual block diagram of a switching architecture, according to an exemplary embodiment. For purposes of illustration, switching architecture 600 is a symmetric switching architecture and is described with reference to the components of free-space optical switch matrix 300 of FIG. 3.

In this example, switching architecture 600 includes input stage 601 coupled to output stage 603 via a plurality of optical fiber transmission lines (e.g., optical fiber transmission line 605) of center stage 607. More particularly, input stage 601 and output stage 603 respectively include "N" input stage switches 609.1-609.N and "N" output stage switches 611.1-611.N that are realized via "2×N" free-space optical switch matrices 300. In this manner, outgoing ports 615 (e.g., outgoing port 313) of input stage switches 609.1-609.N are coupled to incoming ports 615 (e.g., incoming port 311) of output stage switches 611.1-611.N. Namely, the plurality of optical fiber transmission lines (e.g., optical fiber transmission line 605) of center stage 607 are spliced, or otherwise connected, between the respective optical alignment mechanisms 401 of corresponding outgoing ports 613 (e.g., outgoing port 313) and incoming ports 615 (e.g., incoming port 311) of input stage switches 609.1-609.N and output stage switches 611.1-611.N.

Accordingly, the respective optical alignment mechanisms 401 of incoming ports 617 (e.g., incoming port 311) of input stage switches 609.1-609.N and outgoing ports 619 of output stage switches 611.1-611.N are coupled to corresponding incoming and outgoing fiber optic transmission lines 617 and 619. These incoming and outgoing fiber optical transmission mission lines 617 and 619 may be subscriber lines, such that the plurality of optical fiber transmission lines (e.g., optical fiber transmission line 605) of center stage 607 may be main trunk lines. As such, switching architecture 600 is capable of receiving "N" input optical signals via "N" input optical fiber transmission lines 617.1-617.N of input stage switches 609.1-609.N and switching those signals between "N" output optical fiber transmission lines 619.1-619.N of output stage switches 611.1-611.N. It is noted that intermediary switching within input stage switches 609.1-609.N and output stage switches 611.1-611.N is realized via free-space optical transmission paths 301 of free-space optical switch matrices 300.

While switching architecture 600 has been described according to the illustrated embodiment, it is contemplated that switching architecture 600 may be asymmetrically configured, i.e., having "N" inputs and "M" outputs, as well as configured using any number of switching stages.

Figure 7:
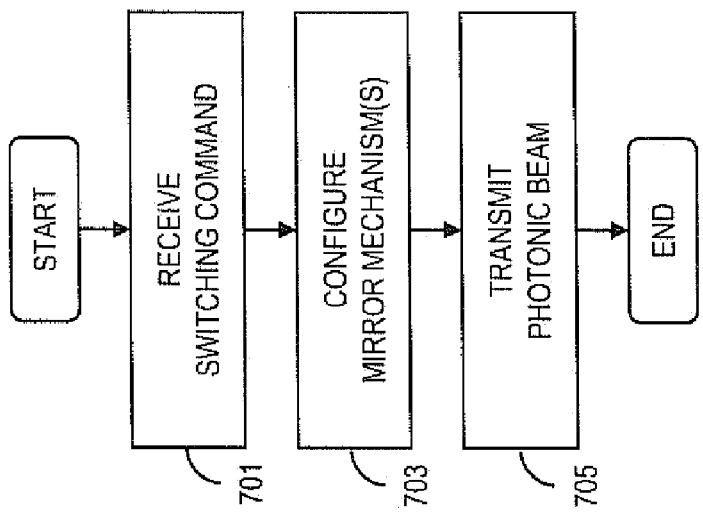
FIG. 7 is a flowchart of a process for automated free-space optical switching, according to an exemplary embodiment.

FIG. 7 is a flowchart of a process for automated free-space optical switching, according to an exemplary embodiment. For illustrative purposes, the process is described with respect to FIGS. 1 and 3. It is noted that the steps of the process may be performed in any suitable order, as well as combined or separated in any suitable manner. In step 701, controller 113 receives a control command(s) to switch an optical signal between a particular input port (e.g., input port 311) and a particular output port (e.g., output port 313). Such commands may be received and/or acquired from memory 115 and, additionally (or alternatively) over one or more of the aforementioned communication networks. Per step 703, controller 113 causes mirror mechanisms 107 to be configured via actuators 111. That is, controller 113 provides control signal(s) to actuators 111 that manipulate (e.g., extend, rotate, or retract) support shafts 319 and 321 and, in turn, mirrors 305 and 307. These control signals may be, in exemplary embodiments, derived based on optimization or calibration information (e.g., the aforementioned mirror positioning information, connection mapping information, etc.) stored to, for example, database 105. According to one embodiment, actuators 111 first extend (or retract) support shafts 319 and 321 to align mirrors 305 and 307 with appropriate input and output port rings 315 and 317. Then, actuators 111 rotate support shafts 319 and 321 to align mirrors 305 and 307 with appropriate input and output ports (e.g., input port 311 and output port 313). In this manner, controller 113 via mirror mechanisms 107 creates free-space optical signal transmission path 301 between input port 311 and output port 313. Once mirror mechanisms 107 are configured, optical cross-connect 100 can then transmit, per step 705, one or more photonic beams (i.e., one or more optical signals) between input port 311 and output port 313 via free-space optical transmission path 301.

The processes described herein for automated optical switching may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 8:
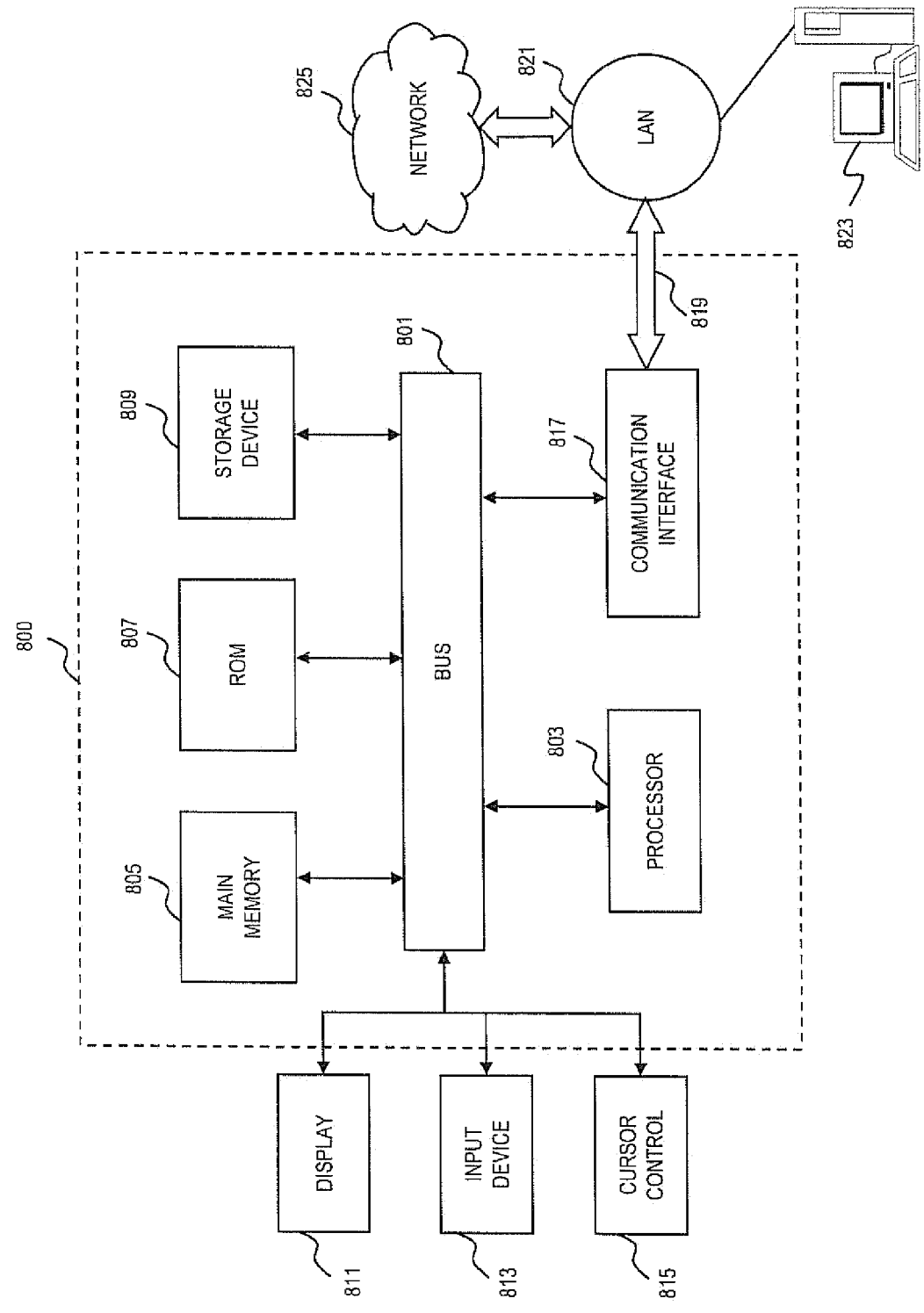
FIG. 8 is a block diagram of a computer system that can be used to implement various exemplary embodiments.

FIG. 8 illustrates computing hardware (e.g., computer system) 800 upon which an embodiment according to the invention can be implemented. The computer system 800 includes a bus 801 or other communication mechanism for communicating information and a processor 803 coupled to the bus 801 for processing information. The computer system 800 also includes main memory 805, such as a random access memory (RAM) or other dynamic storage device, coupled to the bus 801 for storing information and instructions to be executed by the processor 803. Main memory 805 can also be used for storing temporary variables or other intermediate information during execution of instructions by the processor 803. The computer system 800 may further include a read only memory (ROM) 807 or other static storage device coupled to the bus 801 for storing static information and instructions for the processor 803. A storage device 809, such as a magnetic disc or optical disk, is coupled to the bus 801 for persistently storing information and instructions.

The computer system 800 may be coupled via the bus 801 to a display 811, such as a cathode ray tube (CRT), liquid crystal display, active matrix display, or plasma display, for displaying information to a computer user. An input device 813, such as a keyboard including alphanumeric and other keys, is coupled to the bus 801 for communicating information and command selections to the processor 803. Another type of user input device is a cursor control 815, such as a mouse, a trackball, or cursor direction keys, for communicating direction information and command selections to the processor 803 and for controlling cursor movement on the display 811.

According to an embodiment of the invention, the processes described herein are performed by the computer system 800, in response to the processor 803 executing an arrangement of instructions contained in main memory 805. Such instructions can be read into main memory 805 from another computer-readable medium, such as the storage device 809. Execution of the arrangement of instructions contained in main memory 805 causes the processor 803 to perform the process steps described herein. One or more processors in a multi-processing arrangement may also be employed to execute the instructions contained in main memory 805. In alternative embodiments, hard-wired circuitry may be used in place of or in combination with software instructions to implement the embodiment of the invention. Thus, embodiments of the invention are not limited to any specific combination of hardware circuitry and software.

The computer system 800 also includes a communication interface 817 coupled to bus 801. The communication interface 817 provides a two-way data communication coupling to a network link 819 connected to a local network 821. For example, the communication interface 817 may be a digital subscriber line (DSL) card or modem, an integrated services digital network (ISDN) card, a cable modem, a telephone modem, or any other communication interface to provide a data communication connection to a corresponding type of communication line. As another example, communication interface 817 may be a local area network (LAN) card (e.g. for Ethernet™ or an Asynchronous Transfer Model (ATM) network) to provide a data communication connection to a compatible LAN. Wireless links can also be implemented. In any such implementation, communication interface 817 sends and receives electrical, electromagnetic, or optical signals that carry digital data streams representing various types of information. Further, the communication interface 817 can include peripheral interface devices, such as a Universal Serial Bus (USB) interface, a PCMCIA (Personal Computer Memory Card International Association) interface, etc. Although a single communication interface 817 is depicted in FIG. 8, multiple communication interfaces can also be employed.

The network link 819 typically provides data communication through one or more networks to other data devices. For example, the network link 819 may provide a connection through local network 821 to a host computer 823, which has connectivity to a network 825 (e.g. a wide area network (WAN) or the global packet data communication network now commonly referred to as the "internet") or to data equipment operated by a service provider. The local network 821 and the network 825 both use electrical, electromagnetic, or optical signals to convey information and instructions. The signals through the various networks and the signals on the network link 819 and through the communication interface 817, which communicate digital data with the computer system 800, are exemplary forms of carrier waves bearing the information and instructions.

The computer system 800 can send messages and receive data, including program code, through the network(s), the network link 819, and the communication interface 817. In the Internet example, a server (not shown) might transmit requested code belonging to an application program for implementing an embodiment of the invention through the network 825, the local network 821 and the communication interface 817. The processor 803 may execute the transmitted code while being received and/or store the code in the storage device 809, or other non-volatile storage for later execution. In this manner, the computer system 800 may obtain application code in the form of a carrier wave.

The term "computer-readable medium" as used herein refers to any medium that participates in providing instructions to the processor 803 for execution. Such a medium may take many forms, including but not limited to non-volatile media, volatile media, and transmission media. Non-volatile media include, for example, optical or magnetic disks, such as the storage device 809. Volatile media include dynamic memory, such as main memory 805. Transmission media include coaxial cables, copper wire and fiber optics, including the wires that comprise the bus 801. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. An apparatus comprising:
   an input ring extending axially and having a plurality of radially extending openings corresponding to ports configured to interface with respective optical fibers, wherein the openings are arranged about an outer circumferential surface of the input ring; and
   a mirror mechanism situated within the input ring and configured to change a connection state of a free-space optical transmission path defined by the ports.

2. An apparatus according to claim 1, further comprising:
   a processor configured to control automated movements of the mirror mechanism, the automated movements relating to translation along or rotation about an axis of the input ring.

3. An apparatus according to claim 1, further comprising:
   an output ring including a plurality of ports configured to interface with corresponding optical fibers; and
   a second mirror mechanism situated within the output ring and configured to direct the free-space optical transmission path to a particular port of the output ring.

4. An apparatus according to claim 1, wherein a mirror of the mirror mechanism is fixed at a predetermined angle relative to an axis of the input ring.

5. An apparatus according to claim 4, wherein the predetermined angle is approximately 45 degrees.

6. An apparatus according to claim 1, wherein the free-space optical transmission path is monitored by a tracking system and information relating to the connection state is stored in a database.

7. An apparatus according to claim 1, further comprising:
   an optical alignment mechanism configured to align the free-space optical transmission path with respect to a mirror of the mirror mechanism,
   wherein the optical alignment mechanism interfaces with a particular port of the plurality of ports and a particular optical fiber corresponding to the particular port.

8. An apparatus according to claim 7, wherein the optical alignment mechanism is a collimator.

9. An apparatus according to claim 1, wherein the plurality of ports are further disposed about the outer circumferential surface in a plurality of circumferential rings.

10. An apparatus according to claim 1, further comprising:
    a communication interface configured to receive one or more commands for configuring the mirror mechanism over a communication network.

11. A method comprising:
    receiving a command to change a connection state of a free-space optical transmission path; and
    controlling a mirror to change the connection state of the free-space optical transmission path with respect to a particular port of a plurality of ports that interface to respective optical fibers, wherein the ports correspond to radially extending holes disposed about an outer circumferential surface of an axially extending port ring.

12. A method according to claim 11, wherein the step of controlling includes aligning or breaking the free-space optical transmission path with respect to the particular port.

13. A method according to claim 12, wherein the mirror is capable of translation along or rotation about an axis of the port ring.

14. A method according to claim 11, wherein the port ring is an input port ring or an output port ring.

15. A method according to claim 11, further comprising:
    monitoring the connection state; and
    storing information corresponding to the connection state in a database.

16. A method according to claim 11, wherein the outer circumferential surface includes a plurality of circumferential rings.

17. A method according to claim 16, further comprising:
    displacing the mirror to align with a particular one of the circumferential rings, wherein the particular circumferential ring includes the particular port; and
    rotating the mirror to align to the particular port.

18. A method according to claim 11, wherein the free-space optical transmission path is aligned with respect to the mirror via an optical alignment mechanism that interfaces with the particular port and a corresponding optical fiber.

19. A method according to claim 17, wherein the optical alignment mechanism is a collimator.

20. A method according to claim 11, further comprising:
    retrieving, from a database, calibration information relating to one or more predetermined physical configurations of the mirror,
    wherein the calibration information is utilized to control the mirror.

21. A method according to claim 11, wherein the command is received over one or more communication networks.

22. A system comprising:
    an input port ring configured to interface with a first set of optical waveguides;
    a first mirror disposed within the input port ring;
    an output port ring configured to interface with a second set of optical waveguides; and
    a second mirror disposed within the output port ring,
    wherein at least one of the mirrors is rotated about an axis by a command signal to establish a free-space optical transmission path between one of the optical waveguides in the first set of the input port ring and one of the optical waveguides in the second set of the output port ring.

23. A system according to claim 22, further comprising:
    a database configured to store position information of the mirrors corresponding to one of a plurality of connection states.

* * * * *